United States Patent [19]
Suchier

[11] Patent Number: 6,111,213
[45] Date of Patent: Aug. 29, 2000

[54] WELDING FITTINGS ON A HYDRAULIC CYLINDER

[75] Inventor: Nicolas Suchier, Lyons, France

[73] Assignee: Societe de Mecanique d'Irigny, Irigny, France

[21] Appl. No.: 09/056,901

[22] Filed: Apr. 7, 1998

[30] Foreign Application Priority Data

Apr. 7, 1997 [FR] France ................... 97 04437

[51] Int. Cl.⁷ ................................. B23K 26/00

[52] U.S. Cl. ...................... 219/121.63; 219/121.64; 219/121.85; 219/121.78; 219/121.83; 219/121.6

[58] Field of Search ................ 219/121.63, 121.64, 219/121.85, 121.78, 121.83, 121.6; 29/33 T

[56] References Cited

U.S. PATENT DOCUMENTS

| | | | |
|---|---|---|---|
| 4,841,617 | 6/1989 | Schmidt et al. | 29/157.3 AH |
| 4,978,834 | 12/1990 | Griffaton | 219/121.63 |
| 5,231,261 | 7/1993 | Duthoo | 219/121.63 |

*Primary Examiner*—Patrick Ryan
*Assistant Examiner*—M. Alexandra Elve
*Attorney, Agent, or Firm*—Herbert Dubno; Andrew Wilford

[57] ABSTRACT

A fitting is mounted on a hydraulic cylinder tube having a cylindrical outer surface by first positioning the fitting against the surface of the tube with the fitting engaging the surface along an arcuate contact line and then directing a laser beam at the contact line and moving the laser beam along the contact line to weld the fitting to the tube. The surface is centered on an axis and the fitting is positioned such that the contact line is at most 120° long relative to the axis.

3 Claims, 2 Drawing Sheets

WELDING FITTINGS ON A HYDRAULIC CYLINDER

SPECIFICATION

Field of the Invention

The present invention relates to the welding of fittings on a hydraulic cylinder. More particularly this invention concerns a method of and apparatus for welding attachment tabs and like fittings on a cylinder tube of a power-assist steering system.

Background of the Invention

A motor-vehicle power-assist steering system has a double-effect cylinder that serves for the amplification of the forces applied to the system by the steering wheel. The cylinder has a tube which defines its body and which also functions by connecting the power-assist system with the frame of the vehicle and which serves to support various components such as heat shields, tubing clamps and supports, mounting tabs, and the like. It is therefore necessary to mount a certain number of fittings on the cylinder at various locations, these fittings being mounting or support tabs and the like.

The cylinder itself is normally made from a low-carbon steel and is cold drawn. This production method efficiently produces a workpiece with the following characteristics:

outside diameter of H11 type tube +0/−0.16 mm, and outside diameter of H9 type tube +0.062/−0 mm.

In order to mount such a fitting on this type of cylinder tube, the following methods are most commonly used:

MIG or TIG welding with an additive metal, resistance welding, recasting with aluminum, and securing with clamp rings.

The first three mounting procedures are disadvantageous in that the result is normally some thermally caused internal deformation of the tube. Such deformation can be as little as 0.05 mm or as much as 0.3 or 0.4 mm so that it is necessary, after the fittings have been welded into place, to remachine the bore of the tube. If such reboring must be done on a surface actually engaging the piston, it must be done very accurately so that several minutes can be lost during production, making production of this part in a high-speed production line impossible. The fourth method that employs extra hardware for holding the fitting in place is substantially more costly in term of machine parts and often does not produce a fitting that is adequately fixed on the cylinder.

It has further been suggested to use a tube or housing formed of molded aluminum that is integrally cast with the desired mounting tabs or other fittings. The construction of this part is fairly complex and expensive, requiring meticulous molding and machining so that as a result the price of the finished part is not competitive.

OBJECTS OF THE INVENTION

It is therefore an object of the present invention to provide an improved system for mounting fittings on a hydraulic-cylinder tube.

Another object is the provision of such an improved system for mounting fittings on a hydraulic-cylinder tube which overcomes the above-given disadvantages, that is which allows the fittings to be secured very solidly if not integrally in place without deforming the tube.

SUMMARY OF THE INVENTION

A fitting is mounted on a hydraulic cylinder tube having a cylindrical outer surface by first positioning the fitting against the surface of the tube with the fitting engaging the surface along an arcuate contact line and then directing a laser beam at the contact line and moving the laser beam along the contact line to weld the fitting to the tube.

Thus according to the invention laser welding is used. This type of welding transmits a considerable density of energy to a very small location allowing the metal of the fitting and of the tube to be fused together very quickly, without substantially heating the adjacent metal so as to avoid thermal deformation of the tube. As a result the fittings can be mounted quickly and solidly to the tube, without the use of additive metals or aluminum outer housings, greatly reducing the cost of the piece.

According to the invention the surface is centered on an axis and the fitting is positioned such that the contact line is at most 120°.

In effect it is essential to obtain a satisfactory laser-weld seam that the spacing between the parts being fused together be less than 0.15 mm. Thus the outside cylindrical surface of the tube is of H11 quality (that is +0/−0.16 mm) and the stamped fittings normally have a tolerance of at most 0.2 mm. These considerations lead to limiting the contact region as above to about 120° which is ample with respect to the stresses normally put to these fittings. In the case of fittings encircling the tube, the angular limit of at most 120° can be respected by making such fittings in two or more parts, for example of a lower part welded directly to the tube by the method of the invention and an upper part formed like a yoke that is not welded to the tube but instead is fixed to the lower part.

According to the invention the beam is oriented at an angle between 15° and 75° to the axis of the tube. This angle determines the depth of the fusion that makes the weld seam, here 1±0.2 mm, so as to form on the inside of the tube a maximum deformation of 0.01 mm while still very solidly attaching the fitting to the tube.

Preferably in accordance with the invention the laser is a Nd/YAG laser. Such lasers are known for their efficiency and low cost. A laser produces a coherent light beam that, since there is no scattering, can be used to heat an object in a tightly circumscribed location, making welding with this beam particularly effective as the surrounding material is only heated by conduction from the heated area. An Nd/YAG laser uses a crystal composed of atoms of oxygen, aluminum, and yttrium doped with niobium. The wave length of such a laser beam in the low infrared at 1.06 μm is much that such a beam can be transmitted through a fiber-optic cable to a welding head. When such a laser beam is focussed it is possible to achieve high powers of 100,000 to 1,000,000 W/cm². Such a beam produces at the point where it impinges the, for example, steel workpiece a cavity filled with very hot ionized vapors, creating very focussed heating. This is in distinction to electric or flame welding where the entire area must be heated to form a weld seam.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
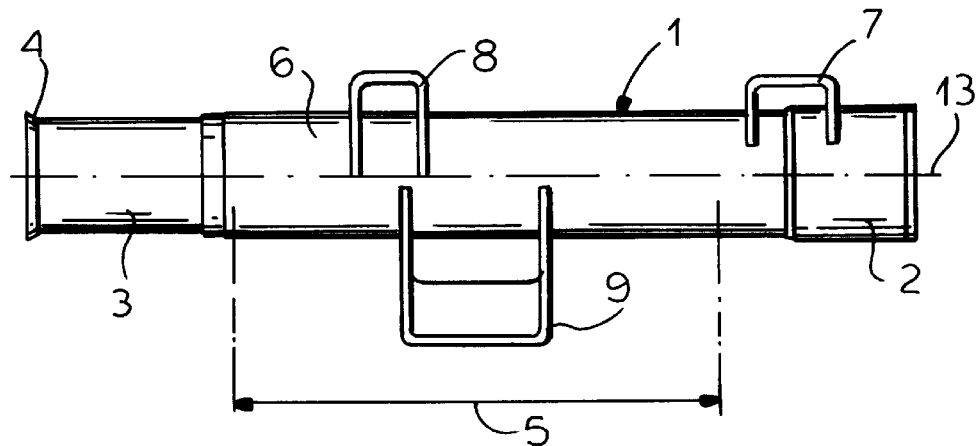
FIG. 1 is side view of a complete tube forming the cylinder of a motor-vehicle power-assist unit.

As seen in FIG. 1 a cylinder tube 1 intended to form part of a motor-vehicle power-assist steering system has a large-diameter end portion 2, a small-diameter end portion 3 defining a outwardly flared end 4, and a central medium-diameter region 5. The tube 1 thus has a stepped cylindrical outer surface 6 to which are fixed a mounting fitting 7, a force-transmitting bracket 8, and support fitting 9 by means of which the tube 1 is secured on the engine.

Figure 2:
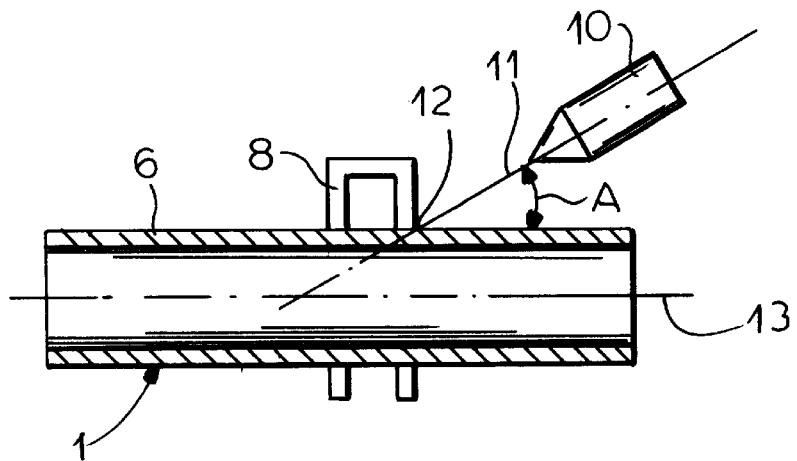
FIG. 2 is an axial section through the tube illustrating how the fittings are welded to it.
Figure 3:
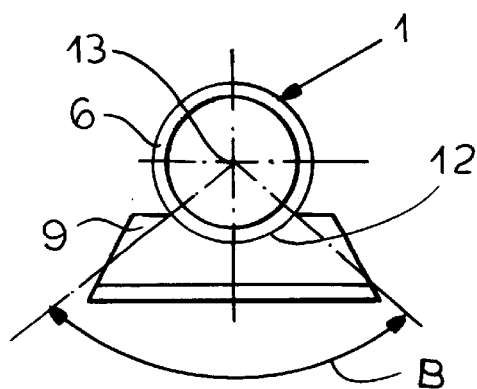
FIG. 3 is an end view of the tube of FIG. 1.

These fittings 7, 8, and 9 are fixed against the outside cylindrical surface 6 of the tube 1 by laser welding as illustrated in FIGS. 2 and 3. A laser 10 with a Nd/YAG source projects a laser beam 11 that is directed at the contact arc 12 between the fitting to be mounted, here the fitting 8, and the surface 6 of the tube 1. The laser beam 11 formes relative to a longitudinal central axis 13 of the tube 1 an angle A which lies between 15° and 75°. The actual angle is selected in accordance with the depth to which the welding should reach, with a greater angle giving greater depth.

In an example, the fittings such as the fitting 8 have a thickness of 2 mm to 3.5 mm while the tube 1 has a wall thickness between 2.5 mm and 2.75 mm. Using a continuous Nd/YAG source, the laser 10 can have a power of 2 KW with a focal length of 100 mm to 200 mm. The region touched by the laser beam 11 can be about 0.6 mm across and the welding location can be moved along the arcuate contact region 12 by tracking the beam at more than 4 m/min, with the beam 10 always lying in a plane including the axis 13. In order to obtain an acceptable weld, taking into account the dimensional tolerances of the outside cylindrical surface 6 of the tube 1, the contact region 12 between the fitting 9 and the tube 1 is limited circumferentially to a sector B extending over about 120° as shown in FIG. 3. The arcuate weld seam thus produced is formed at each edge of the fitting 7, 8, or 9.

For a tube 1 dimensioned as described above the fused weld zone only reaches to a depth of 1 mm±0.2 mm in order to deform the inner surface of the tube at most 0.01 mm while still solidly securing the fittings 7, 8, and 9 to the tube 1. As a result no remachining of the inside surface of the tube 1 is needed.

Figure 4:
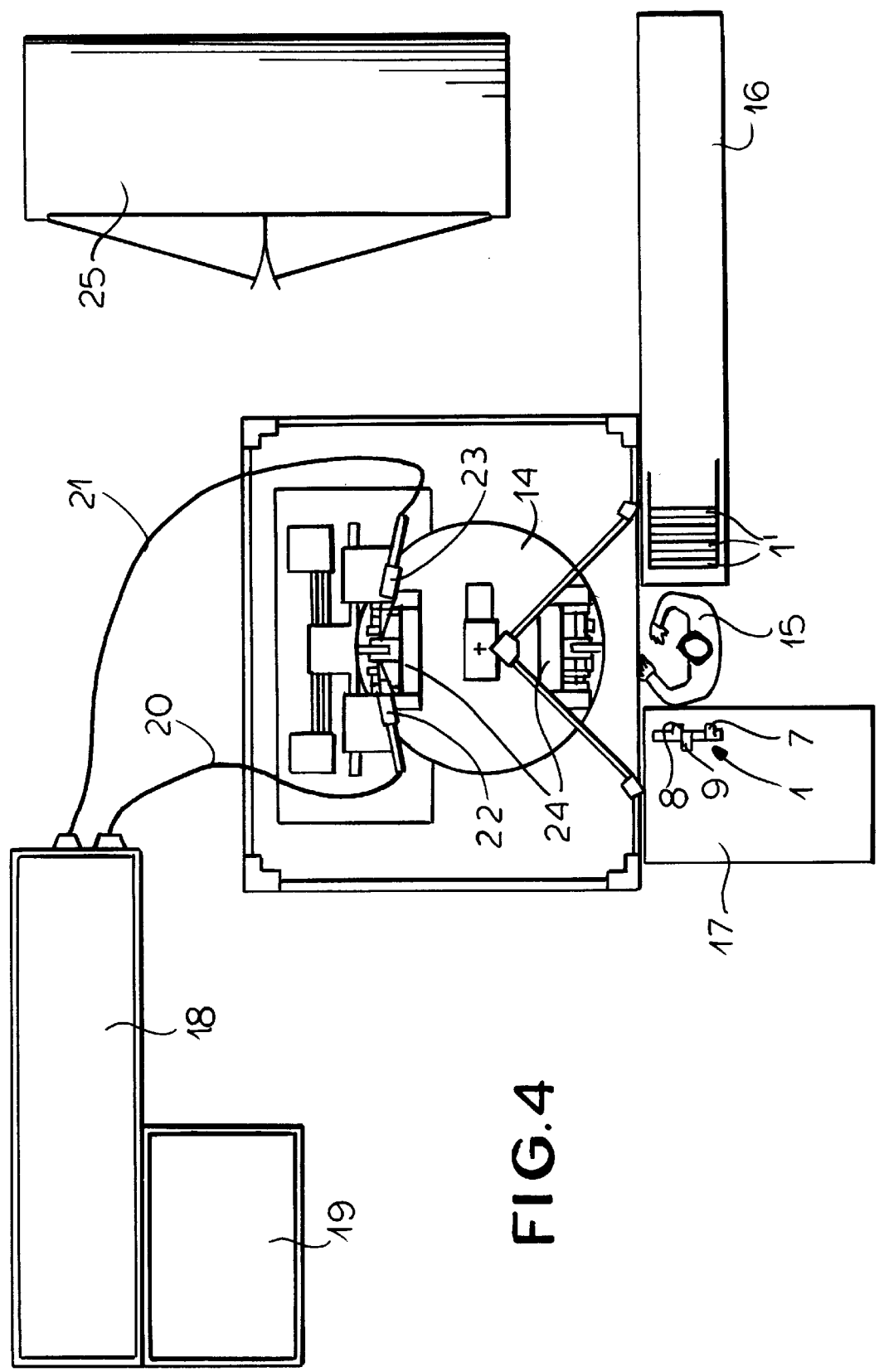
FIG. 4 is a small-scale schematic top view illustrating a setup for carrying out the method shown in FIG. 2.

FIG. 4 shows a setup forming part of an assembly line that is used for making the tube 1 according to the invention. The setup has a turntable 14 to one side of which is a station for an operator 15 who can pick up plain tubes 1' from a supply conveyor 16 and fit them to one of two diametrally opposite workpiece holders 24 carried on the turntable 14. The finished tubes 1 are put in an output container 17.

The side of the turntable 14 opposite the operator 15 is provided with two welding tools 22 and 23 connected via respective fiber-optic lines 20 and 21 to a laser 18 having a refrigeration plant 19. The laser tools 22 and 23 are automatically trained on the weld locations 12 and moved appropriately to form the desired arcuate seams. Supplies and the controller for the system can be provided in an adjacent cabinet 25.

I claim:

1. A method of mounting a support fitting to a hydraulic cylinder tube having a cylindrical outer surface, the method comprising the steps of:

positioning the support fitting against the surface of the tube with the support fitting engaging the surface along an arcuate contact line of at most 120°; and directing a laser beam at the contact line and moving the laser beam along the contact line to weld the support fitting to the tube over an arc of at most 120°.

2. The method defined in claim 1, further comprising the step of orienting the beam at an angle between 15° and 75° to the axis.

3. The method defined in claim 1 wherein the laser is a Nd/YAG laser.

* * * * *